United States Patent [19]

Ahonen

[11] 4,099,733
[45] Jul. 11, 1978

[54] OFF-THE-ROAD VEHICLES
[75] Inventor: Ahti Ilmari Ahonen, Tampere, Finland
[73] Assignee: Valmet Oy, Finland
[21] Appl. No.: 786,463
[22] Filed: Apr. 11, 1977
[30] Foreign Application Priority Data
   Apr. 12, 1976 [FI] Finland .................................. 760992
[51] Int. Cl.² .......................... B60S 9/00; B60G 17/00
[52] U.S. Cl. ................................. 280/6.1; 280/112 A; 180/26 R
[58] Field of Search ...................... 280/6 R, 6.1, 6.11, 280/112 R, 112 A, 6 H; 180/26, 41, 46

[56] References Cited
U.S. PATENT DOCUMENTS

| 3,712,404 | 1/1973 | Walquist | 280/6 H |
| 3,792,748 | 2/1974 | Regier | 280/112 A |

Primary Examiner—Philip Goodman
Attorney, Agent, or Firm—Steinberg & Blake

[57] ABSTRACT

An off-the-road type of vehicle which is adapted to travel on the rough terrain has a pair of frames distributed longitudinally of the vehicle, these frames, for example, forming a cab frame which is adapted to accommodate an operator of the vehicle and a load-carrying frame. A pair of ground-engaging structures such as wheels are associated with the frames to support the latter for travelling movement. A suspension connects one of the ground-engaging structures with the frame associated therewith, and this suspension includes an elastically yieldable structure to provide the possibility of elastic yielding movement in this suspension. A joint structure interconnects the pair of frames so that they are turnable one with respect to the other at least about an axis which extends longitudinally of the vehicle in the direction of travel thereof and which is substantially horizontal when the vehicle is on substantially horizontal ground. A second elastically yieldable structure is operatively connected with this joint structure to provide for elastic yielding resistance to turning of the frames one with respect to the other about the axis of the joint structure.

9 Claims, 7 Drawing Figures

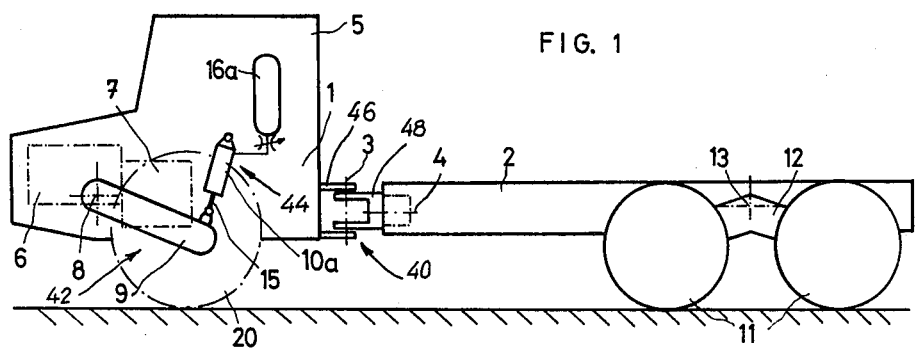
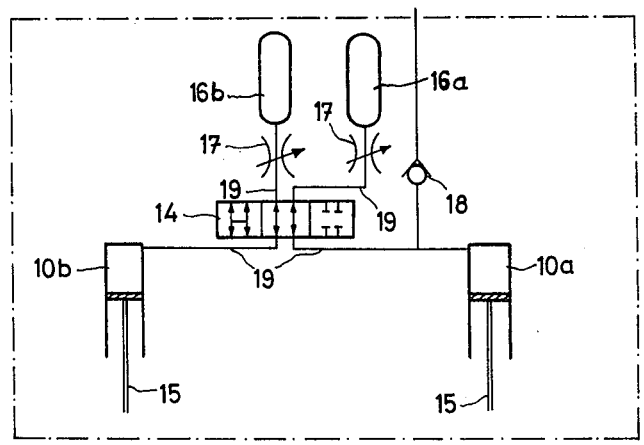
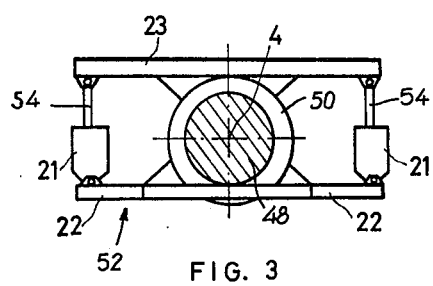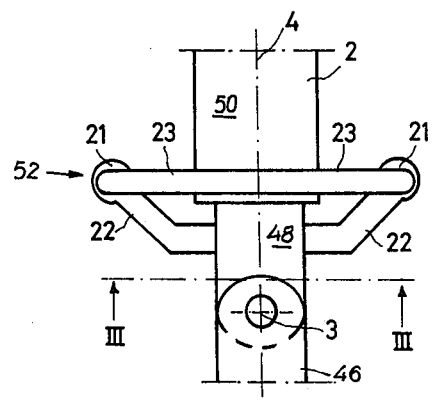

OFF-THE-ROAD VEHICLES

BACKGROUND OF THE INVENTION

The present invention relates to vehicles.

In particular, the present invention relates to off-the-road vehicles of the type which are adapted to travel on rough terrain such as, for example, a forest tractor.

The invention relates especially to elastically yieldable structures to be associated with frames of vehicles of the above type, these frames forming, for example, a cap of the vehicle as well as a load-carrying part thereof.

In known vehicles of the above type, such as forest tractors, the axle units usually are completely unsprung. The sole components which have any significant elasticity with such vehicles are the tires thereof. As a result, the dynamic behavior of such vehicles is unsatisfactory. This latter factor necessitates extremely slow speeds of travel for such vehicles since even at relatively low speeds the frames of such vehicles are subjected to powerful impact stresses and the forces of acceleration to which the operator of the vehicle is subjected are known to be dangerous to his health. While attempts have been made to correct these latter drawbacks, as by providing special seat designs for the vehicle operator, these latter attempts have proved to be of only minor beneficial significance. Experience has shown that it is particularly difficult to damp the lateral oscillations or accelerations of the vehicle by way of the construction of the seat thereof.

Various spring arrangements have been suggested for off-the-road vehicles of the above general type, and in this connection reference may be made to Swedish publication print No. 370,911 as well as to Finnish Pat. applications Nos. 3294/73 and 3518/74 both of which are publicly available. However, systems as shown in the latter publications have not proved to be fully satisfactory and have not gained any extensive use. The prior art constructions have not successfully isolated the driver of the vehicle from the frame oscillations, even through attempts have already been made to reduce the oscillation of the entire vehicle.

SUMMARY OF THE INVENTION

It is thus a primary object of the present invention to provide a vehicle of the above general type which will avoid the above drawbacks.

Furthermore, in addition to reducing acceleration forces to which the driver of the vehicle is subjected, it is an object of the invention also to reduce stresses to which other frame structure of the vehicle is subjected.

Moreover, it is an object of the present invention to provide a construction according to which while the vehicle of the invention has a sprung chassis structure, nevertheless the vehicle has a great stability and the structure of the invention will not increase the risk of toppling of the vehicle or tipping-over of the vehicle to one side or the other. As is well known, vehicles of the above general type are subjected to a considerable risk of toppling or tipping-over due to the terrain on which they travel and the operations which they carry out.

It is a more specific object of the present invention to avoid the above drawbacks and improve the driving comfort of the operator of the vehicle by reducing the possibility of lateral oscillation of the frame of the vehicle which forms the cab which accommodates the vehicle operator as well as by damping vertical oscillations, so that stresses acting on the frame structure of the vehicle will also be reduced.

The vehicle of the invention includes a pair of frame means distributed longitudinally of the vehicle. Thus, these frame means may include the cab of the vehicle, for accommodating the driver thereof, as well as a frame means adapted to carry a load or heavy machinery for carrying out predetermined operations or power-transmitting machinery. A pair of ground-engaging means, such as wheels, for example, are operatively connected with the pair of frame means to support the latter for travel. A suspension means forms the operative connection between one of the ground-engaging means and the frame means associated therewith, the latter frame means being the cab of the vehicle, for example. A joint means interconnects the pair of frame means so that they are turnable one with respect to the other about at least a substantially horizontal axis which extends longitudinally of the vehicle in the direction of travel thereof and which is substantially horizontal when the vehicle is on substantially horizontal ground. A pair of elastically yieldable means are provided, one of the latter means forming part of the suspension means and the other of the elastically yieldable means being operatively connected to the above joint means. Thus, by way of this pair of elastically yieldable means the ground-engaging means which is connected to the suspension means will be capable of elastically yielding with respect to its associated frame means, while the other of the elastically yieldable means which is operatively connected with the joint means will provide for an elastically yielding resistance to turning of the pair of frame means one with respect to the other about the above axis.

The suspension means referred to above may form the operative connection between ground-engaging components such as wheels and a frame means which forms the cab at the front of the vehicle. This suspension means includes known wishbone assemblies carrying the front wheels or bogies of the vehicle with the front wheels or bogies being separately spring-suspended with respect to the front frame means by way of the elastically yieldable means which forms part of the above suspension means. Moreover, the other elastically yieldable means which is operatively connected with the joint means provides a springy type of action with respect to torsion of the front and rear frame means with respect to each other.

BRIEF DESCRIPTION OF DRAWINGS

The invention is illustrated by way of example in the accompanying drawings which form part of this application and in which:

FIG. 1 is a schematic side elevation of a vehicle according to the invention;

FIG. 2 is a schematic illustration of an elastically yieldable means forming part of a suspension means for the front wheels of the vehicle of FIG. 1;

FIG. 3 is a transverse section taken along line III-III of FIG. 4 in the direction of the arrows and illustrating a joint means interconnecting a pair of frame means of the vehicle of FIG. 1 as well as illustrating an elastically yieldable means associated with this joint means;

FIG. 4 is a top plane view of the structure of FIG. 3 showing in addition how this structure is connected to the front frame means so as to provide for turning movement of the frame means one with respect to the other about a substantially vertical axis;

DESCRIPTION OF PREFERRED EMBODIMENTS

Figure 5:
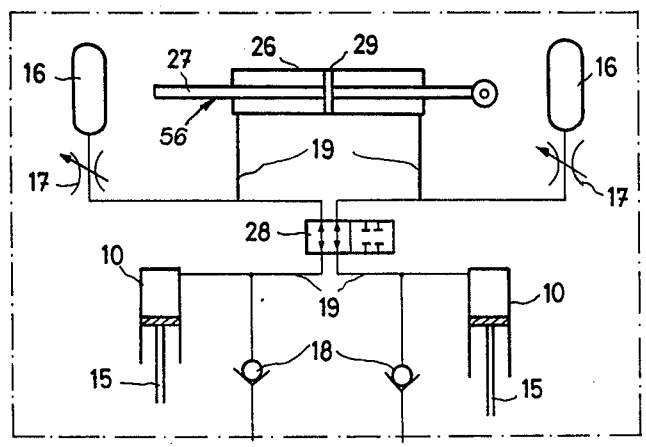
FIG. 5 is a schematic illustration of a construction according to which the pair of elastically yieldable means, of the type shown in FIGS. 2 and 3, respectively, are coupled together so as to have a conjoint operation.

Referring to FIG. 1, the off-the-road type of vehicle illustrated therein includes a pair of frame means 1 and 2. The frame means 1 forms in the illustrated example the front frame means of the vehicle, while the other frame means 2 forms the rear frame means thereof. A joint means 40 interconnects the pair of frame means 1 and 2, so that they are turnable one with respect to the other both about the illustrated vertical axis 3 as well as about the illustrated horizontal axis 4. Structures of this type are known.

The front frame means 1 in the illustrated example includes the cab 5 which accommodates the driver of the vehicle, this cab 5 having in its interior the controls for the operation of the vehicle. The vehicle includes at the front frame means 1 an engine 6 as well as a gear box 7, as schematically shown in FIG. 1. Associated with the front frame means 1 is a ground-engaging means 20 adapted to support the front frame means 1 for travel, the illustrated ground-engaging means including at least a pair of components in the form of wheels which are respectively situated at opposite sides of a vertical plane which contains the longitudinal central axis 4 of the vehicle.

A suspension means 42 connects the ground-engaging means 20 to the frame means 1. This suspension means includes a pair of wishbone units 9 which are respectively pivoted to the front frame means 1 at the pivot axis 8 indicated in FIG. 1. These wishbone units 9 respectively carry the wheel 20 in a well known manner. Thus, the wishbone units 9 are situated at opposite sides of the vehicle.

The suspension means 42 includes in addition to the wishbone units 9 an elastically yieldable means 44 serving to interconnect the ground-engaging means 20 with the frame means 1, by way of the suspension means 42, in an elastically yieldable manner. In the illustrated example the elastically yieldable means 44 includes a pair of piston-and-cylinder assemblies respectively connected with the wishbone units 9. These assemblies respectively include pistons 15 which are pivotally connected to the wishbone units 9 and cylinders 10a 10b which respectively receive the pistons 15, in the manner shown schematically in FIG. 2. The cylinders 10a, 10b are pivotally connected to the frame, as schematically indicated for the cylinder 10a in FIG. 1, and these cylinders are adapted to contain a fluid pressure medium such as a suitable hydraulic fluid which is under pressure.

As is indicated in FIG. 2, the chambers of the cylinders 10a, 10b which are filled with the hydraulic fluid under pressure communicate through flexible tubes or hoses 19 with a pair of pressure accumulators 16a, 16b, which also form part of the elastically yieldable means 44. Thus, each of the cylinders 10a, 10b is connected with its own pressure accumulator. The tubular members 19 include adjustable throttle passage 17 as schematically shown in FIG. 2. Thus, these adjustable throttles 17 are capable of regulating the size of the opening through which the hydraulic fluid flows, so that by adjustment of the adjustable throttles 17 it is possible to adjust the damping of the spring suspension. thus enabling the latter to be regulated as desired.

Moreover, the tubular members 19 are operatively connected with a valve means 14 which is adjustable and which has three possible positions as schematically indicated in FIG. 2. In the illustrated position of the valve means 14, the pair of cylinders 10a, 10b respectively communicate with the pair of pressure accumulators 16a, 16b. However, if the valve means 14 is shifted to the right, as viewed in FIG. 2, then it is possible, as schematically illustrated, to connect the cylinders 10a, 10b directly to each other so that the fluid pressure medium will flow directly from one cylinder to the other. Thus in this position of adjustment of the valve means 14 it is possible to interconnect the pair of piston-and-cylinder assemblies so that the wheels 20 are connected to each other in a manner which is the equivalent of a mechanical pendulum axle operatively connected with the wheels 20. Thus, to the extent that one of the wheels will move upwardly with respect to the frame means 1, the other of the wheels will move downwardly with respect thereto, in this particular position of the valve means 14.

However, it is also possible to shift the valve means 14 to the left, as viewed in FIG. 2, thus cutting off, in this position, the communication between the cylinders 10a, 10b and the pressure accumulator 16a, 16b, while also preventing communication directly between the cylinders 10a10b. When the valve means 14 is placed in this particular position, then the pistons 15 are respectively locked in the cylinders 10a10b so that it is possible to lock the wheels 20 against movement with respect to the frame means 1. Thus the ground-engaging means 20 can be locked in any desired position, for example during use of certain work implements which may be mounted on the frame means 2, or while using a loading member which loads the frame means 2. In this way it is possible to increase the stability of the vehicle in certain special operating situations. The hydraulic system includes a check valve 18 as shown schematically in FIG. 2. Through the check valve 18 it is possible, when the valve 14 is shifted to the right from the position of FIG. 2, supply hydraulic fluid under pressure as required to the entire system shown in FIG. 2.

The system operates most advantageously, however, in the position of the valve means 14 shown in FIG. 2 according to which the elastically yieldable means 44 provides for independent elastic yieldability of the ground-engaging components 20 which are respectively situated on opposite sides of the vertical plane which contains the axis 4.

Thus, it will be seen that the valve means 14, which can be adjusted by the operator in the cab 5, through suitable adjusting structure available to the operator, forms a control means which controls the elastically yieldable means 44, so that various type of operation thereof are possible. Thus at the option of the operator it is possible to provide by way of the control means 14 an interconnection between the components 20 which is the equivalent of the interconnection thereof by way of a pendulum axle. Also it is possible by way of the control means 14, at the option of the operator, to inhibit the operation of the elastically yieldable means 44 and instead to lock the components 20 in a given position with respect to the frame means 1.

As has been indicated above, the pair of frame means 1 and 2 are interconnected by way of a joint means 40 so that they are turnable one with respect to the other about the vertical axis 3. Thus, the frame means 1 has, for example, a pair of members 46 rigidly fixed to the frame means 1 at the rear thereof and spaced vertically from each other. These members 46 of the frame means 1 receive between themselves a pair of forwardly extending parts of a member 48 in the form of a rigid pin or stub shaft, also forming part of the frame means 1. A suitable vertical pivot pin extends through aligned openings of the parts 46 and 48 to provide the pivotal connection between the frame means 1 and 2 so that they can turn one with respect to the other about the vertical axis 3. Suitable turning cylinders can be connected in a known way to this part of the structure so as to provide a body-pivot steered type of vehicle.

The axis of the horizontal pin or shaft 48 coincides with the turning axis 4 of the joint means 40. This shaft 48 extends turnably into a bore of a tubular member 50 which is fixed to and forms part of the frame means 2 at the front end thereof, as shown in FIGS. 3 and 4, the axis of the tubular member 50 also coinciding with the axis 4. Thus by way of the cooperation between the members 48 and 50 the frame means 1 and 2 are turnable one with respect to the other about the horizontal axis 4.

In connection with this horizontal axis 4, a second elastically yieldable means 52 is provided in accordance with the invention.

This elastically yieldable means 52, which is shown schematically in FIGS. 3 and 4, includes a pair of rigid member 22 and 23 respectively fixed, as by welding, for example, to the members 48 and 50 of the joint means 40. The elastically yieldable means 52 also includes a pair of piston-and-cylinder assemblies. These assemblies respectively include, in the illustrated example, cylinders 21 pivotally connected to the member 22 and pistons 54 pivotally connected to the member 23 and slidably received in the cylinders 21 which respectively have beneath the pistons 54 working chambers supplied with a fluid under pressure such as a suitable hydraulic fluid, although if desired it is possible to situate in the cylinders 21 air under pressure so that a pneumatic elastic yieldable means is provided. If hydraulic fluid is utilized, then through suitable hoses or the like the chambers of the cylinders 21 can communicate respectively with a pair of pressure accumulators similar to the accumulators 16a and 16b shown in FIG. 2. Thus in this way it is possible to achieve an elastically yieldable resistance to turning of the frame means 1 and 2 each with respect to the other in either direction about the axis 4. Of course, the pipes or the like which connect the cylinders 21 respectively to a pair of pressure accumulators may also cooperate with suitable throttles, such as throttles 17, and with a suitable control means in the form of a valve similar to the valve 14 of FIG. 2, such a valve in this case having the possibility either of providing free communication between the cylinders 21 and the pair of pressure accumulators or of cutting off this communication when it is desired to lock the pair of frame means 1 and 2 to each other so that they cannot turn one with respect to the other about the horizontal axis 4.

The favorable spring-action properties of the chassis or frame structure of the invention is derived from the combined action of the elastically yieldable means 44 and the elastically yieldable means 52. These elastically yieldable means are provided with dimensions which will bring about a minimizing of the sidewise or lateral oscillation of the front frame means 1. In a vehicle which has four wheels, for example, this combined action is most favorable when the spring systems for the front wheels 20 and for the horizontal axis 4 are dimensioned so as to be in proportion to each other in such a way that the torsional displacement between the front and rear frames 1 and 2 will be substantially equal to the torsion of an imaginary axle which interconnects the front frame means 1 and the front wheels 20.

As is apparent from FIG. 1, the rear frame means 2 is of such a constructions that it can accommodate a load or a work implement or the like, or suitable axle units with power transmission.

The rear frame means 2 is also supported by a ground-engaging means 11 in the form of suitable wheels which in this example are carried by bogies 12 connected with the frame means 2 for turning movement about a vertical axis 13. Thus at each side of the vertical plane which includes the axis 4, there will be a bogie 12 turnable with respect to the frame 2 about a vertical axis 13 and carrying wheels 11. The most desirable and advantageous spring arrangement for the vehicle is achieved, according to a further feature of the invention, by eliminating any elastic connection between the rear wheels 11 or the bogie 12 and the rear frame means 2. Thus the rear frame means 2 of the vehicle of the invention is preferably unsprung.

It is also possible to provide in connection with the suspension means 42, in a simple advantageous manner, the capability of stepless adjustment of the ground clearance of the vehicle. Thus for this purpose hydraulic liquid under pressure can be supplied to the system through the check valve 18, and through an unillustrated pipe it is possible, if desired, to withdraw fluid under pressure from the cylinders 10a, 10b so as to reduce the clearance of the vehicle with respect to the ground as desired. Such a stepless adjustment of the ground clearance can be provided in a well known manner. Each wishbone unit 9 is preferably of a box-type of construction and houses in its interior a transmission by means of which the traction or travelling power of the vehicle is transmitted to each of the front wheels 20 so as to provide the vehicle with the required traction.

As has been indicated above, it is possible by way of the control means 14 to change the operation from that illustrated in FIG. 2 where the elastic yieldability of the components 20 on each side of the vehicle are independent of each other to an arrangement where the wishbone units 9 are connected to each other by placing the interiors of the cylinders 10a and 10b in communication with each other. This operation is achieved by rendering the left part of the valve means 14 operative, as described above. Thus, with this type of operation the front axle assembly will act in the manner of a mechanical pendulum axle so that in this case the elastically yieldable meand will provide for unresisted torsion of the front frame means 1 with respect to the axis 4. Of course, when this particular adjustment of the control means 14 is provided, the elastically yieldable means 52 is locked against operation, as by placing a valve similar to the valve 14 and operatively connected with pipes communicating with the cylinders 21 in a position preventing flow of fluid through these pipes, as described above.

The above-described hydropneumatic spring systems of the front wheels 20 and of the joint means 40 with respect to the axis 4 may be connected to each other so as to act conjointly. An embodiment which achieves this result is illustrated in FIGS. 5–7.

Figure 6:
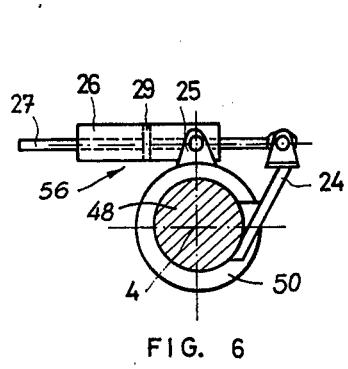
FIG. 6 is a sectional elevation taken along line IV—IV of FIG. 7 in the direction of the arrows and showing an embodiment of an elastically yieldable means associated with the joint means but having a construction different from that of FIG. 3, the structure of FIG. 6 being adapted to be used with the arrangement illustrated in FIG. 5.
Figure 7:
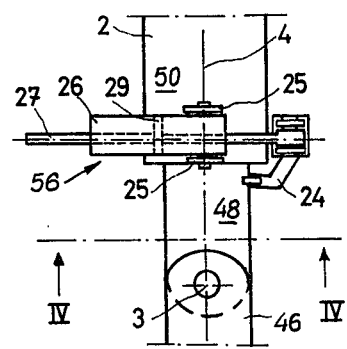
FIG. 7 is a top plan view of the structure of FIG. 6 showing also the manner in which the front and rear frame means are connected to each other for turning movement one with respect to the other about a vertical axis.

Referring to FIGS. 5–7 it will be seen that the elastically yieldable means 56 is operatively connected with the members 48 and 50 of the joint means 40 of FIG. 1 for elastically resisting turning of the pair of frame means 1 and 2, one with respect to the other, about the longitudinal axis 4. The elastically yieldable means 56 includes a cylinder 26 operatively connected by way of the pivot support 25 to the member 50 of the joint means. A piston 29 is slidable in the cylinder 26 and is pivotally connected at its right end, as viewed in FIG. 6, to one end of a rigid member 24 which is fixed, as by welding, for example, to the member 48. Thus, the cylinder 26 is connected with the frame means 2 while the piston 29 is connected with the frame means 1.

The cylinder 26 has opposed end walls through which the piston rod 27 passes in a fluid-tight manner. Thus, the cylinder 26 has in its interior a pair of chambers respectively situated at opposite sides of the piston 29, as is apparent from FIGS. 5–7.

As is apparent from FIG. 5, the tubular members 19, which may be in the form of flexible hoses, as pointed out above, serve to connect the left chamber of cylinder 26 with the left cylinder 10, which corresponds to the cylinder 10b FIG. 2 and which communicates with a pressure accumulator 16 in the manner shown in FIG. 5. The right chamber of the cylinder 26 is connected in a similar manner to the right cylinder 10 which corresponds to the cylinder 10a of FIG. 2, and in this case also a pressure accumulator 16 is provided.

The pair of tubular members 19 have operatively connected thereto a control means 28 in the form of a suitable valve means which in the position of FIG. 5 connect the chambers of the cylinder 26 respectively to the cylinders 10 in the manner illustrated. However, it is also possible to shift the valve 28 to the left, as viewed in FIG. 5, so that the communication between the chambers of the cylinder 26 and the cylinders 10 is interrupted.

With the embodiment of FIGS. 5–7, the movement of the pistons 15 with respect to the cylinders 10 will bring about a turning of the front frame means 1 with respect to the rear frame means 2, about the axis 4, in a manner which is the equivalent of the operation which would be provided by a pendulum axle connected with the wheels 20. In a similar manner, turning of the rear frame means 2 with respect to the front frame means 1 about the axis 4 will produce an opposite movement of the piston rods 15 with respect to the cylinders 10, in a manner which is the equivalent of the tilting of an imaginary front pendulum axle.

The dimensioning of the cylinders 10 and 26 is arranged so as to provide the desired relationship between the relative turning of the front and rear frame means. Inasmuch as the system includes gas pressure accumulator 16 and throttling valves 17, the turning movements as well vertical movement of the front frame means 1 can be rendered elastic.

It is to be noted that with the embodiment of FIGS. 5–7 since the pressure of the hydraulic fluid in a static condition is equal on both sides of the piston 29 of the cylinder 26, there are no forces transmitted to the structure which mounts the cylinder 26. As was pointed out above, the control valve 28 can be shifted so as to lock at least the front frame means 1 for the duration of operations such as loading operations or operating with certain working implements, if any, or in other equivalent special situations. It is to be noted that when the control valve 28 is shifted to prevent communication between the cylinders 10 and the chambers of the cylinder 26, these chambers of the cylinder 26 still communicate with the pressure accumulator 16, so that in this position the rear frame means is connected at the joint means 40 to an elastically yieldable means which is the equivalent of that of FIGS. 3 and 4.

The above-described pneumatic and hydropneumatic spring elements 10, 21, may, if desired, also be replaced with other spring elements such as, for example, simple leaf springs which also are easy to mount. However, due to the frictional damping of leaf springs, the use of shock absorbers is required with such construction.

It has been found that an off-the-road travelling vehicle constructed according to the invention provides a remarkable reduction of accelerations and dynamic forces, on the order of 10–70%, as compared with prior art constructions. Inasmuch as the spring system increases the amplitudes of certain movements in certain cases, the risk of toppling or tipping increases, particularly in the case where the tractor is loaded. It is precisely in view of this latter factor that a spring suspension for the rear frame means is not preferred.

Of course, the invention is not to be narrowly confined to the embodiments presented above merely by way of example. The details of these embodiments may of course vary within the scope of the inventive concept defined by the claims which follow.

What is claimed is:

1. In a vehicle, particularly an off-the-road type of vehicle which is adapted to travel on rough terrain, a pair of frame means arranged longitudinally of the vehicle in the direction of travel thereof, and a pair of ground-engaging means respectively operatively connected to said pair of frame means and extending downwardly therefrom into engagement with the ground beneath said pair of frame means to support said pair of frame means for travel along the ground, suspension means operatively connected to one of said ground-engaging means and the frame means associated therewith for forming the operative connection between the latter ground-engaging means and frame means, joint means operatively connected with both of said frame means for interconnecting said pair of frame means for turning movement with respect to each other at least about an axis which extends longitudinally of the vehicle and which is substantially horizontal when the pair of ground-engaging means engage substantially horizontal ground, and a pair of elastically yieldable means one of which forms part of said suspension means for elastically and yieldably interconnecting the ground-engaging means and frame means which are operatively connected to each other by way of said suspension means and the other of which is operatively connected with said joint means for elastically and yieldably opposing relative turning of said pair of frame means with respect to said axis of said joint means.

2. The combination of claim 1 and wherein said pair of elastically yieldable means cooperate to reduce to a minimum possible lateral oscillation of the frame means to which said suspension means is connected with respect to said axis of joint means.

3. The combination of claim 1 and wherein the other of said ground-engaging means is operatively connected to the frame means associated therewith in a non-elastic manner, and the latter frame means being adapted to carry a large weight such as that of a load, work-producing machinery, a power transmission means, or the like.

4. The combination of claim 1 and wherein said one ground-engaging means includes a pair of components situated on opposite sides of a vertical plane which includes said axis of said joint means, and control means operatively connected with said elastically yieldable means of said suspension means for controlling the latter elastically yieldable means to provide, at the option of an operator of the vehicle, an interconnection between said components which is the equivalent of the interconnection thereof by way of a pendulum axle.

5. The combination of claim 1 and wherein a control means is operatively connected with the elastically yieldable means which is operatively connected to said joint means for inhibiting, at the option of an operator of the vehicle, the operation of the latter elastically yieldable means and instead locking said pair of frame means to each other so that they connot turn relative to each other with respect to said axis of said joint means.

6. The combination of claim 1 and wherein a coupling means couples said pair of elastically yieldable means to each other so that they operate conjointly.

7. The combination of claim 6 and wherein a control means is operatively connected with said coupling means for placing the latter, at the option of an operator of the vehicle, in a condition according to which the pair of elastically yieldable means are separated from each other and don not operate conjointly.

8. The combination of claim 6 and wherein said ground-engaging means which is operatively connected with said suspension means includes a pair of ground-engaging components respectively situated on opposite sides of a vertical plane which contains said axis of said joint means, the latter joint means including a pair of members respectively connected with said pair of frame means and turnable one with respect to the other about said axis of said joint means, said elastically yieldable means which is operatively connected to said joint means including a cylinder connected to one of said members of said joint means and a piston slidable in said cylinder and connected to the other of said members of said joint means, said cylinder having in its interior a pair of chambers respectively situated on opposite sides of said piston and adapted to contain a fluid pressure medium, said elastically yieldable means of said suspension means including for each of said components of said ground-engaging means connected with said suspension means a piston-and-cylinder assembly including a cylinder which also is adapted to contain a fluid pressure medium, said coupling means providing communication between one chamber in said cylinder which is connected to a member of said joint means and the interior of the cylinder of one of said assemblies which is connected with one of said ground-engaging components, and said coupling means also providing communication between the other of said chambers of the cylinder connected to a member of said joint means and the cylinder of the other assembly of said suspension means which is connected to the other ground-engaging component.

9. The combination of claim 8 and wherein said coupling means includes a pair of tubular means respectively communicating with said chambers of said cylinder connected to a member of said joint means and also respectively communicating with the cylinders of the assemblies of said suspension means, so that the fluid pressure medium can flow freely through said pair of tubular means, and valve means operatively connected with said pair of tubular means and having an open position where said pair of tubular means are both open so that fluid pressure medium can flow therethrough, said valve means also having a closed position closing said pair of tubular means so as to render said coupling means, at the option of the operator, inoperative to provide conjoint operation between the pair of elastically yieldable means.

* * * * *